United States Patent
Ala-Laurila

(10) Patent No.: US 6,246,871 B1
(45) Date of Patent: Jun. 12, 2001

(54) METHOD AND APPARATUS FOR PROVIDING ACCESS OF MESSAGES TO MULTIPLE RECIPIENTS IN CELLULAR NETWORKS

(75) Inventor: Juha Ala-Laurila, Tampere (FI)

(73) Assignee: Nokia Networks Oy (FI)

( * ) Notice: Subject to any disclaimer, the term of this patent is extended or adjusted under 35 U.S.C. 154(b) by 0 days.

(21) Appl. No.: 09/404,964

(22) Filed: Sep. 24, 1999

(51) Int. Cl.[7] .................................................. H04M 11/10
(52) U.S. Cl. ........................ 455/413; 455/412; 455/418; 379/88.16; 379/67.1
(58) Field of Search ..................... 455/412, 413, 455/418, 414; 379/88.16, 67.1, 88.22, 88.12

(56) References Cited

U.S. PATENT DOCUMENTS

| | | | |
|---|---|---|---|
| 5,260,986 | * | 11/1993 | Pershan . |
| 5,497,373 | * | 3/1996 | Hulen et al. ........................ 370/79 |
| 5,740,230 | * | 4/1998 | Vaudreuil ........................... 379/88 |
| 5,790,638 | | 8/1998 | Johnson et al. .................... 379/67 |
| 5,828,732 | | 10/1998 | Gow . |
| 5,926,526 | * | 7/1999 | Rapaport et al. ................ 379/88.25 |
| 5,941,946 | | 8/1999 | Baldwin et al. . |
| 5,953,400 | * | 9/1999 | Rosenthal et al. ................ 379/202 |

FOREIGN PATENT DOCUMENTS

| | | |
|---|---|---|
| 0 781 028 A2 | 6/1997 | (EP) . |
| 2 225 916 | 6/1990 | (GB) . |
| WO 98/10608 | 3/1998 | (WO) ....................... 7/32 |
| WO 98/58332 | 12/1998 | (WO) . |
| WO 98/37678 | 4/2001 | (WO) . |

* cited by examiner

Primary Examiner—Thang Cong Le
Assistant Examiner—Lana Le
(74) Attorney, Agent, or Firm—Cohen, Pontani, Lieberman & Pavane

(57) ABSTRACT

A message accessing apparatus and method for providing access of select messages (voice or text) to multiple recipients in cellular networks. A network subscriber accesses a subscriber's mailbox which contains a message, by entering a voice messaging service address code and entering a personal access code. A temporary access code is then assigned to the selected message and the messaging service address code and temporary access code are transmitted to the intended recipients of the voice message to allow the intended recipients to access the selected message by contacting the voice messaging service and entering the temporary access code.

25 Claims, 2 Drawing Sheets

METHOD AND APPARATUS FOR PROVIDING ACCESS OF MESSAGES TO MULTIPLE RECIPIENTS IN CELLULAR NETWORKS

BACKGROUND OF THE INVENTION

1. Field of the Invention

The present invention pertains to a message system for use in a telecommunications network. More particularly, the present invention relates to a method and apparatus for providing multiple recipients limited access to a network subscriber's message mailbox in a cellular communications network for retrieving designated messages.

2. Description of the Related Art

Modern cellular networks, such as Global System for Mobile Communications (GSM), provide several efficient mechanisms for wireless messaging among subscribers. One such mechanism is the use of Short Message Services (SMS) wherein relatively short messages (typically up to 160 characters) are communicated over a communication network using common SMS transfer procedures to intended recipients. The expense or cost to a user of SMS is less than that of a standard voice message (e.g. a telephone call) thus making SMS an attractive alternative for communicating short messages.

Another mechanism used for efficient messaging among system users is voice mailboxing, which allows users to communicate with each other through temporarily stored messages in a message database. Voice mailbox features are commonplace in modern communications systems and are employed when a user attempts, unsuccessfully, to reach a recipient. In that event, the user will have the option of storing a message (either voice or text) for the intended recipient in memory (e.g., a mailbox) accessible by the recipient via an authentication procedure, for example, a code or password input through the recipient's mobile station or another mobile station or a conventional telephone. Oftentimes, however, it is desirable for a network subscriber to broadcast messages to a group of recipients or to allow a group of recipients access to a common message such as, for example, when a user is a member of a group or team and requires dissemination of a particular message to all of the team members. To accomplish such a task, existing voice mailbox systems require separately contacting the mailboxes of all group members and conveying the common message. Such redundancy is time consuming and costly to the user who must place multiple calls on the cellular phone network, i.e. a separate call to each group member.

Several existing systems provide for conveyance of a common message to multiple recipients. For example, U.S. Pat. No. 5,790,637 (Johnson et al.) and PCT Application WO 98/10608 (Green) provide for the conveyance of a common message to members of a group by selecting a desired group, i.e. one of a plurality of pre-stored groups. A drawback of such systems is that the group members must be pre-defined, thus maling it difficult to designate specific recipients for messages. Other known systems, such as the system described in PCT Application WO 98/37678 (Miner) require the broadcasting of a common message to multiple recipients who are designated by a user.

SUMMARY OF THE INVENTION

A voice mail method and apparatus are provided for use with a wireless communications network to allow a network subscriber to provide limited access to a network subscriber mailbox for the purpose of retrieving messages. The inventive method provides for the subscriber to access a network mailbox system through use of a telephone number or other access code such as an internet URL, and then access the subscriber mailbox utilizing a subscriber access code, such as a personal password. The subscriber mailbox contains a pre-stored temporary message which may be created by the subscriber and intended for distribution to recipients, or created by a third party for receipt by the subscriber, and for which the subscriber intends to further distribute to recipients. Once the subscriber mailbox is accessed with the subscriber access code, a temporary access code or password is assigned to the pre-stored message, which allows the pre-stored message to be accessed by recipients of the temporary access code. A notification message, including the temporary access code and an address code which provides access to the network mailbox system servicing the subscriber mailbox is then transmitted to the intended recipients of the pre-stored message. The notification message can be transmitted in any known manner such as via email, voice messaging or SMS. The recipients can then access the pre-stored message by entering the address code and the temporary access code.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
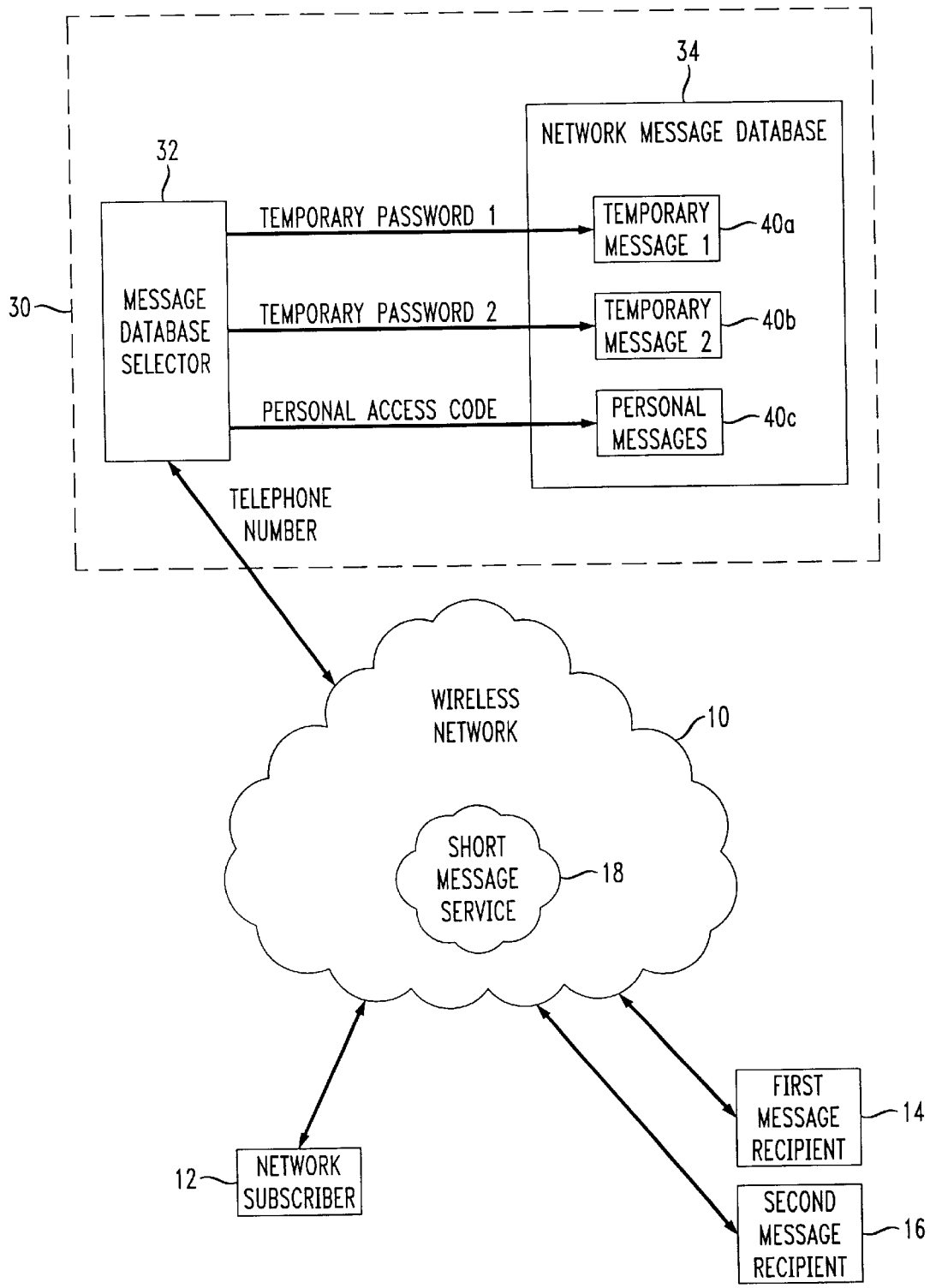
FIG. 1 is a diagram of a wireless network employing the inventive voice messaging apparatus and method.

With reference now to FIG. 1, a network 10 such as a GSM cellular telephone network is shown interfacing various network subscribers with each other and with a voice mail server 30. For the purposes herein, a network subscriber is a user of the network through one or more tenninal devices, such as conventional telephones, mobile telephones, computers, facsimile machines, personal digital assistants (PDA's) and other wireless communicators. Also, and for ease in describing the currently preferred embodiment of the present invention, the network subscribers are identified as a subscriber 12, a first message recipient 14 and a second message recipient 16. The operation of wireless network 10 is well known to those having ordinary skill in the art and supplies communication channels through which the exchange of information (e.g., voice, data, etc.,) among network subscribers occurs. Wireless network 10 also includes a short message service (SMS) for communicating relatively short messages (currently messages up to 160 characters) between subscribers. The SMS, which is also well-known to those having ordinary skill in the art, utilizes common SMS transfer procedures for this purpose. The subscriber charges for SMS transmission is typically less than cellular phone air charges.

Most cellular telephones provide voice mailbox features which allow network subscribers to store and retrieve voice and/or text messages. For example, when a first subscriber telephones a second subscriber over the network 10 and the second subscriber is unavailable, e.g., a "busy" signal is received or if the second subscriber telephone is inactive, the first subscriber will be connected to the voice mail server 30. Voice mail server 30 services numerous mailboxes including a mailbox assigned to the first subscriber. The second subscriber can then leave a message (voice or text) which is stored in the first subscriber's mailbox for retrieval by the first subscriber at a later time.

The voice mailboxes are stored in a network message database 34, which is typically a memory array for providing the storage—at particular addresses ("mailboxes"), of voice and/or text messages intended for recipients. The message may be stored as an analog signal or digitally. To retrieve messages, a mailbox owner (e.g., the first subscriber) must access the message database selector 32, which may be a control block and/or a processor, by dialing an address code such as a telephone number. Thereafter, a greeting is typically conveyed with a prompt requesting the mailbox owner to enter a pre-selected "personal" access code or password by selecting appropriate keys on a mailbox owner's terminal device (e.g. a cellular telephone). Once a password is correctly entered, the mailbox owner is provided access to the mailbox and is given a menu of options by the mail server 30, which allows a mailbox owner to, for example, listen to or read messages, save messages or erase messages from the mailbox.

While existing wireless mail systems are adequate for providing standard messaging and retrieval such as in the manner explained above, they do not provide for a cost effective and efficient way of conveying a common message to a group of recipients. Such a feature is oftentimes desirable when a group or team of subscribers must communicate with each other through messaging. In particular, situations exist where a network subscriber must communicate a common message to multiple recipients. The message may be one generated by the subscriber, or one existing on the subscriber's mailbox which was created by a third person and which the subscriber intends to forward to multiple recipients.

In accordance with the currently preferred embodiment, an inventive method and apparatus allow for the multiple conveyance of a common message to intended recipients without the need for multiple telephone calls to the recipients. This is accomplished by segregating a subscriber's mailbox into private memory locations and non-private memory locations, and assigning access codes or passwords to both types of locations. For example, in the network message database 34 numerous memory locations 40 exist for storing temporary messages. Three such locations are depicted in FIG. 1 as temporary message 1 stored in memory location 40*a*, temporary message 2 stored in memory location 40*b* and personal messages stored in memory location 40*c*. The personal messages are those intended only for access by the mailbox owner (e.g. network subscriber 12) and are accessible by entry of the subscriber personal password or secret access code.

The temporary messages are those that subscriber 12 will make available for access to designated recipients. This is accomplished by the subscriber 12 assigning a temporary access code (temporary password) to each temporary message memory location 40. The temporary password allows a recipient of the password to access the memory location corresponding to the password and, thereby, retrieve the message(s) stored therein while preventing access and retrieval of other messages stored in the subscriber message database or mailbox 34. Of course, the temporary messages can also be accessed through use of the subscriber personal password. In other words, the personal password will provide unlimited access to the messages in a subscriber mailbox whereas the temporary password will provide access only to the message(s) to which the temporary password is assigned. The network subscriber will maintain manipulation control over all messages in a subscriber mailbox, such as for deleting, saving and/or forwarding of messages. Moreover, a temporary password will become invalid upon deletion of a corresponding message or upon transfer of a corresponding message from a temporary message to a personal message.

Once the temporary passwords are assigned to corresponding temporary messages the passwords as well as the telephone number of the mail server 30 must be conveyed to the intended message recipients to alert the recipients of the existence of a message and to provide access to the message. This is accomplished by the network subscriber 12 contacting the intended recipients and conveying a notification message with the necessary codes, i.e. the address codeltelephone number for server 30 and the temporary access code corresponding to a temporary message. The notification message is preferably conveyed to the intended recipients in a short text message transmited through SMS 18 but may also be a voice message. In either case the notification message may be conveyed in any other method such as by electronic mail. The notification message may be received by and stored in a terminal device of the recipient for later use by the recipient in accessing the message.

When retrieval is desired, each recipient will access the mail server 30 by dialing the server telephone number and entering the transmitted temporary access code to retrieve a corresponding message. Note that the temporary access code will not provide access to stored messages other than the message to which the access has been assigned. Thus, for example, if the first recipient 14 and the second recipient 16 are to receive temporary message 1, a notification message containg temporary password 1 will be transmitted to recipients 14 and 16 along with the telephone number for the server 30, and the recipients can then use the information to access memory location 40*a* for playback of temporary message 1 without being provided access to memory locations 40*b* or 40*c*.

Figure 2:
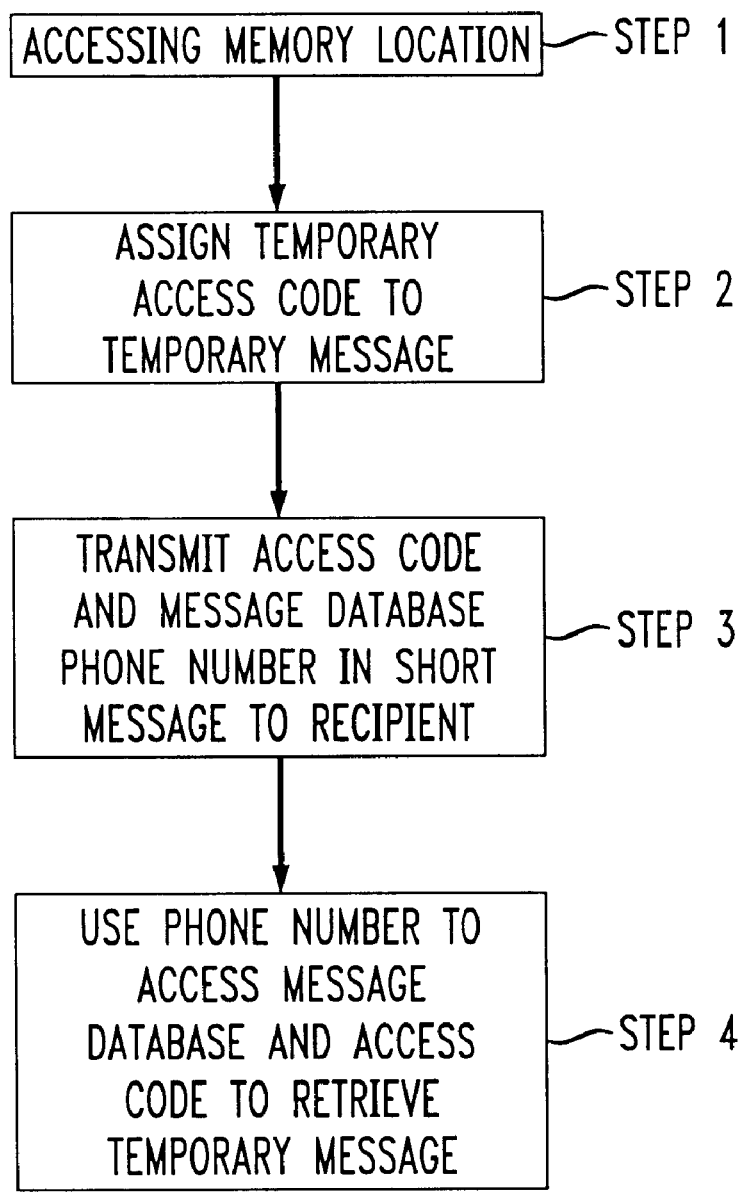
FIG. 2 is a flowchart of the presently preferred embodiment of the voice messaging method.

As the transmission of the notification message in the form of a short message or email transmission is substantially less costly than multiple wireless telephone calls, the inventive method and apparatus provide a subscriber with a cost effective technique of disseminating information (e.g. messages) to multiple recipients. In this manner, the inventive method described as a flow chart in FIG. 2 is performed by the subscriber placing a single phone call to access a designated memory location or mailbox (step 1) for leaving a temporary message or for converting a personal message to a temporary message—in the case of a preexisting message left by a third person. Thereafter, the subscriber will assign a temporary password to the temporary message (step 2) and then forward the necessary retrieval codes to the intended recipients (step 3). The recipients will then place telephone calls to the mail server 30 using the transmitted telephone number and then use the temporary access code to retrieve the temporary message (step 4).

The inventive method shown in FIG. 2 can be easily implemented in existing voice and text mail systems through slight modification of the software on which the mail server operates. In particular, the mail control functions can be enhanced to provide options for (1) recording temporary messages and assigning temporary passwords and (2) assigning temporary passwords to an existing message—such as when an existing message must be forwarded to multiple recipients. In addition, the message database 34 must be extended to accommodate segregation of messages into messages accessible by temporary passwords, and messages accessible only by personal access codes.

While the currently preferred embodiment described above includes the use of a wireless network, such as a telecommunications network, it will be readily appreciated by those having ordinary skill in the art that the present invention can be implemented using land or fixed communication systems. For example, internet uses can be employed wherein a network subscriber is assigned a mailbox accessible via a designated URL and password. Temporary access codes can be assigned to designate messages, and email or other communications techniques can be employed to convey the mailbox URL and temporary access code to intended recipients of the designated message.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and method steps which perform substantially the same function in substantially the same way to achieve the same results are within the scope of the invention. Moreover, it should be recognized that elements and method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for providing access in a wireless communications network to intended recipients of a pre-stored message contained in a memory location of a messaging system, the memory location assigned to a network subscriber and being accessible by the network and having an address code and a subscriber access code for use by the subscriber for storing and retrieving messages stored in the subscriber memory location, comprising the steps of:
   accessing the memory location with the address code and the subscriber access code;
   assigning a temporary access code to the pre-stored message to provide broadcast of the pre-stored message when said temporary access code is received by a control; block of the messaging system in communication with the memory location; and
   wirelessly transmitting a notification message to terminal devices used by the intended recipients of the pre-stored message, the notification message including the address code and said temporary access code, to allow the intended recipients to receive the pre-stored message by contacting the control block of the messaging system with the address code and then communicating said access code to the control block.

2. The method of claim 1, wherein said notification message is transmitted over the network.

3. The method of claim 1, wherein the pre-stored message comprises a voice message and wherein said notification message comprises a text message containing alphanumeric characters.

4. The method of claim 1, wherein the pre-stored message comprises a text message and wherein said notification message comprises a text message containing alphanumeric characters.

5. The method of claim 1, wherein the pre-stored message comprises a voice message and wherein said notification message comprises a voice message.

6. The method of claim 1, wherein said notification message is transmitted using SMS transfer procedures.

7. The method of claim 2, where in said notification message is transmitted through the network using SMS transfer procedures.

8. The method of claim 1, wherein said temporary access code remains valid until the pre-stored message is deleted by the subscriber.

9. The method of claim 1, wherein the network subscriber comprises a first network subscriber and wherein the pre-stored message originates from a second network subscriber.

10. The method of claim 1, wherein said memory location contains personal messages retrievable through the use of the subscriber access code, and wherein the pre-stored message is retrievable through the use of said temporary access code.

11. The method of claim 1, wherein said accessing step comprising dialing the address code on a terminal device and entering the subscriber access code on the terminal device.

12. An apparatus for providing access in a wireless communications network to intended recipients of a pre-stored message contained in a memory location of a messaging system, the memory location assigned to a network subscriber and being accessible by the network and having an address code and a subscriber access code for use by the subscriber for storing and retrieving messages stored in the subscriber memory location, comprising:
   means for accessing the memory location with the address code and the subscriber access code;
   means for assigning a temporary access code to the pre-stored message to provide broadcast of the pre-stored message when said temporary access code is received by a control block of the messaging system in communication with the memory location; and
   means for wirelessly transmitting a notification message to terminal devices used by the intended recipients of the pre-stored message, the notification message including the address code and said temporary access code, to allow the intended recipients to receive the pre-stored message by contacting the control block with the address code and then communicating said access code to the control block.

13. The apparatus of claim 12, wherein said transmitting means comprises means for transmitting said notification message over the network.

14. The apparatus of claim 12, wherein the pre-stored message comprises a voice message and wherein said notification message comprises a text message containing alphanumeric characters.

15. The apparatus of claim 12, wherein said notification message is transmitted using SMS transfer procedures.

16. The apparatus of claim 13, wherein said notification message is transmitted through the network using SMS transfer procedures.

17. The apparatus of claim 12, wherein said temporary access code remains valid until the pre-stored message is deleted by the subscriber.

18. The apparatus of claim 12, wherein the network subscriber comprises a first network subscriber and wherein the pre-stored message originates from a second network subscriber.

19. The apparatus of claim 12, wherein said memory location contains personal messages retrievable through the use of the subscriber access code, and wherein the pre-stored message is retrievable through the use of said temporary access code.

20. The apparatus of claim 12, wherein said means for accessing comprises a cellular telephone.

21. The apparatus of claim 20, wherein said cellular telephone is capable of displaying text messages.

22. A method for providing access in a communications network to intended recipients of a pre-stored message contained in a memory location of a messaging system, the memory location assigned to a network subscriber and being accessible by the network and having an address code and a subscriber access code for use by the subscriber for storing and retrieving messages stored in the subscriber memory location, comprising the steps of:

accessing the memory location with the address code and the subscriber access code;

assigning a temporary access code to the pre-stored message to provide broadcast of the pre-stored message when said temporary access code is received by a control block of the messaging system in communication with the memory location; and transmitting a notification message to terminal devices used by the intended recipients of the pre-stored message, the notification message including the address code and said temporary access code, to allow the intended recipients to receive the pre-stored message by contacting the control block of the messaging system with the address code and then communicating said access code to the control block.

23. The method of claim 22, wherein said step of transmitting comprises electronic mail transmission over a computer network.

24. The method of claim 22, wherein the pre-stored message comprises a voice message and wherein said notification message comprises a text message containing alphanumeric characters.

25. The method of claim 22, wherein the pre-stored message comprises a text message and wherein said notification message comprises a text message containing alphanumeric characters.

* * * * *

UNITED STATES PATENT AND TRADEMARK OFFICE
CERTIFICATE OF CORRECTION

PATENT NO. : 6,246,871 B1
DATED : June 12, 2001
INVENTOR(S) : Juha Ala-Laurila

Page 1 of 1

It is certified that error appears in the above-identified patent and that said Letters Patent is hereby corrected as shown below:

<u>Column 5,</u>
Line 52, after "control" delete ";".

Signed and Sealed this

Nineteenth Day of March, 2002

Attest:

JAMES E. ROGAN
*Director of the United States Patent and Trademark Office*

*Attesting Officer*